United States Patent [19]

Newberg

[11] Patent Number: 4,814,550

[45] Date of Patent: Mar. 21, 1989

[54] POWER LINE ISOLATING APPARATUS AND METHOD

[75] Inventor: James C. Newberg, Custer, S. Dak.

[73] Assignee: Black Hills Engineering & Development Corp., Custer, S. Dak.

[21] Appl. No.: 66,511

[22] Filed: Jun. 26, 1987

[51] Int. Cl.$^4$ .......... H02G 1/02; H01B 17/12; H01H 85/54

[52] U.S. Cl. .......... 174/138 R; 24/134 L; 24/134 N; 174/169; 174/177; 200/48 R; 337/181

[58] Field of Search .......... 174/138 R, 169, 172, 174/177; 200/48 R, 48 KB, 49; 337/168, 171, 180, 181, 187, 191, 193

[56] References Cited

U.S. PATENT DOCUMENTS

| 1,313,249 | 8/1919 | Bellows | 174/172 |
| 1,920,522 | 8/1933 | Pinson | 174/138 R X |
| 2,838,595 | 6/1958 | Parkyn | 174/138 R |
| 3,287,491 | 11/1966 | Hubbard et al. | 174/138 R |
| 3,499,129 | 3/1970 | Hulteen et al. | 200/48 R |
| 3,813,504 | 5/1974 | Anderson | 200/48 R |
| 3,838,233 | 9/1974 | Bridges | 200/48 R |
| 4,661,662 | 4/1987 | Finke et al. | 200/48 R |

FOREIGN PATENT DOCUMENTS 197087 7/1938 Switzerland .......... 200/49

Primary Examiner—Laramie E. Askin
Attorney, Agent, or Firm—Fields, Lewis, Pittenger & Rost

[57] ABSTRACT

A method and apparatus for isolating electric power lines includes an insulator assembly to which is pivotally connected two line clamps. After the clamps clamp to the wire, the wire is cut so that the insulator isolates the line. In one form the clamping surfaces are curved in the longitudinal direction to make up for the loss of line length due to the elongation of the assembly under line tension. Cut-out assemblies for fuse and disconnect purposes are readily applied to the assembly by a lineman standing on the ground below.

25 Claims, 3 Drawing Sheets

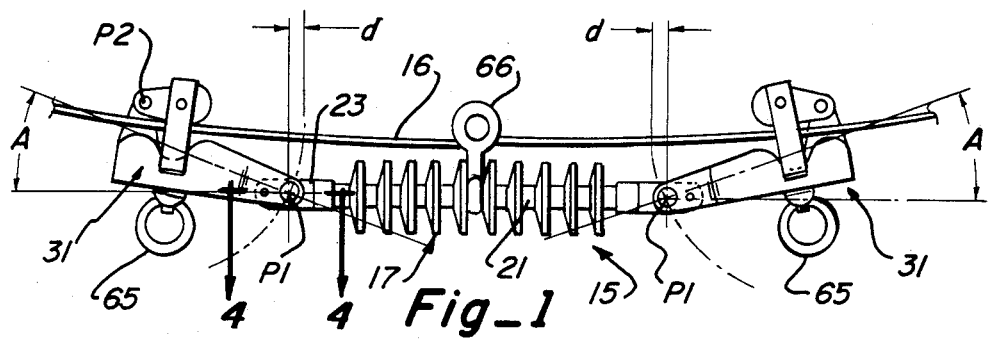
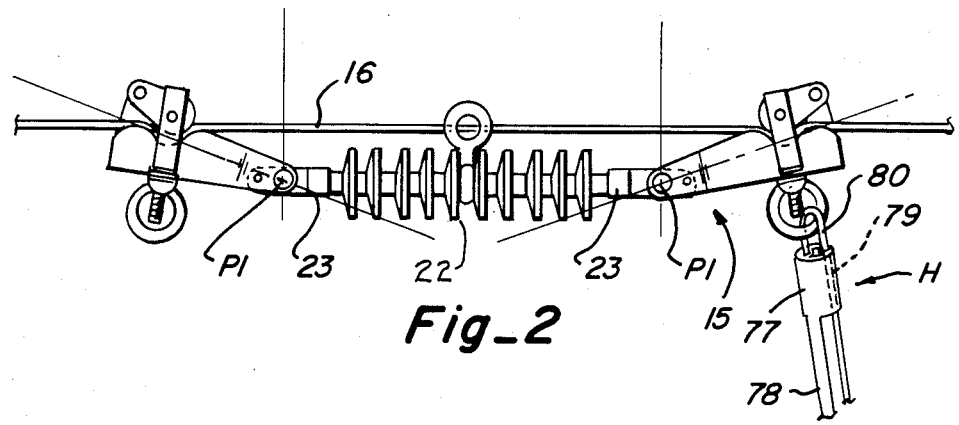
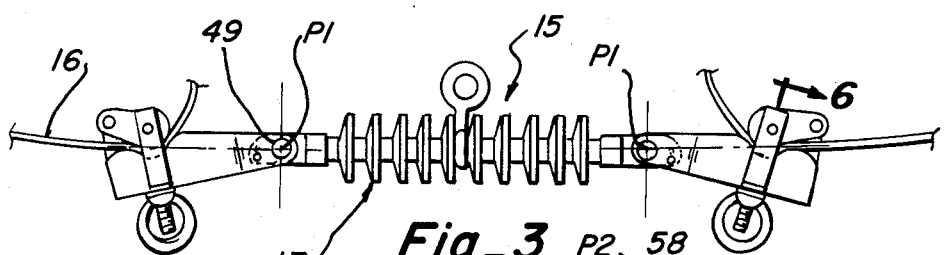
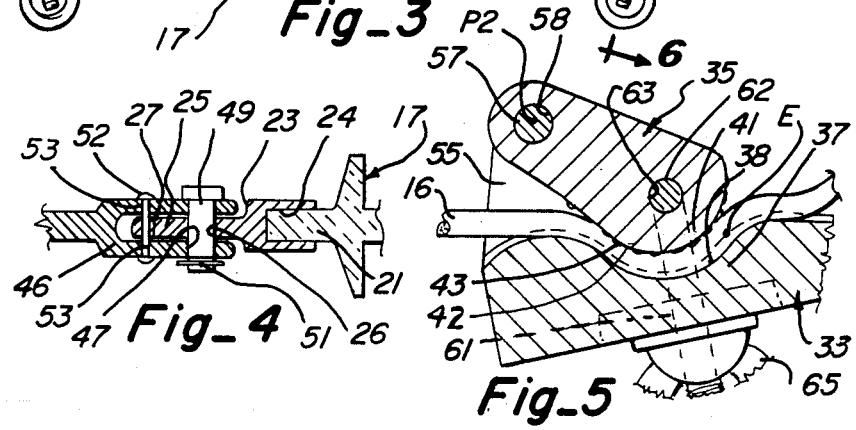

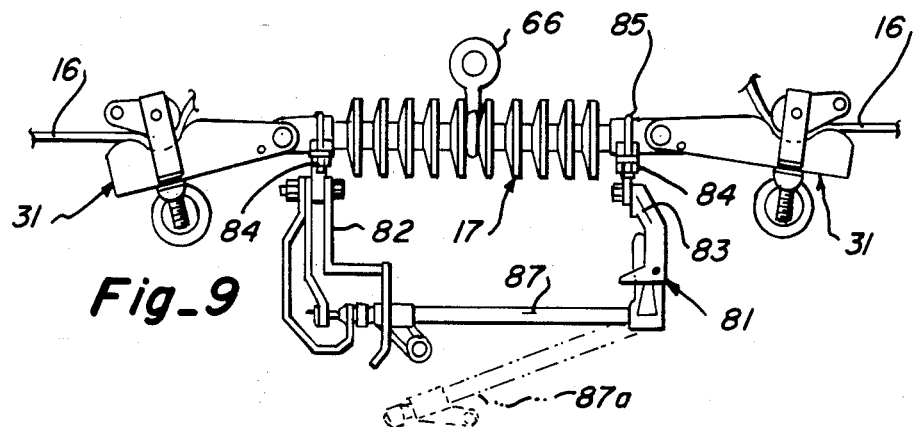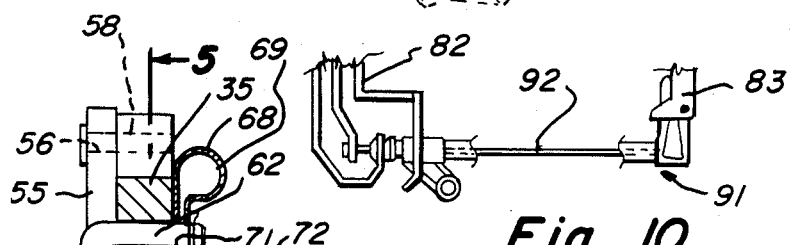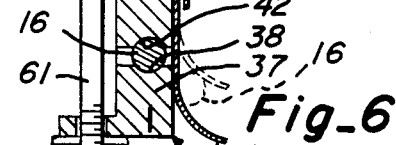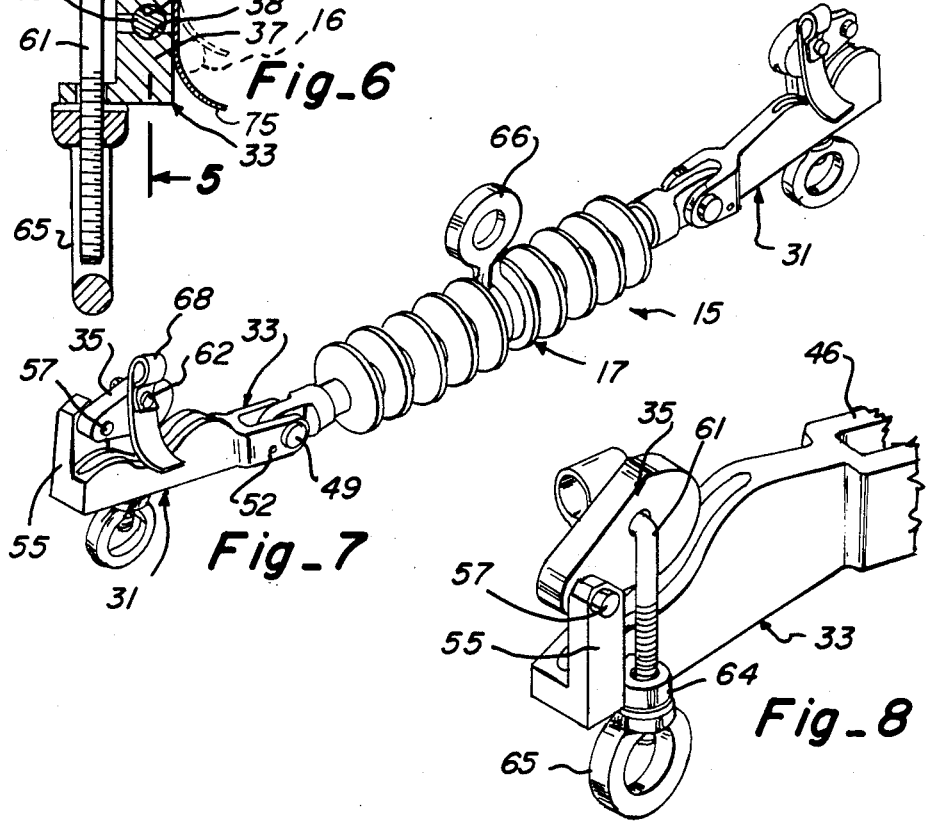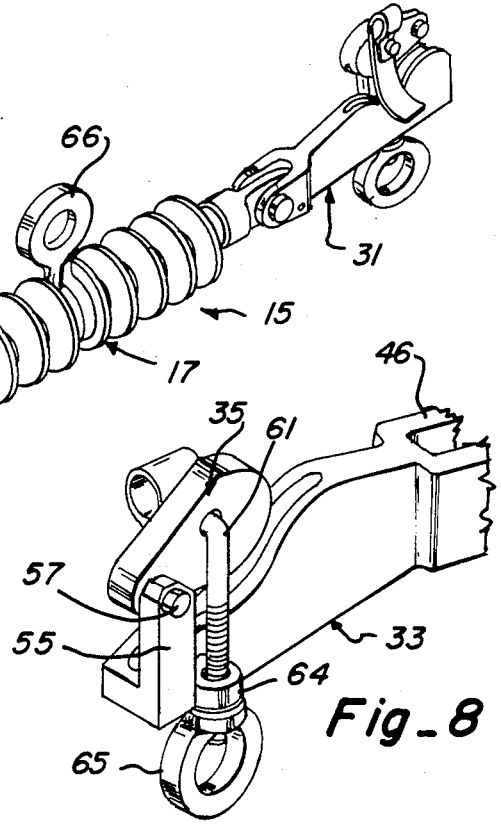

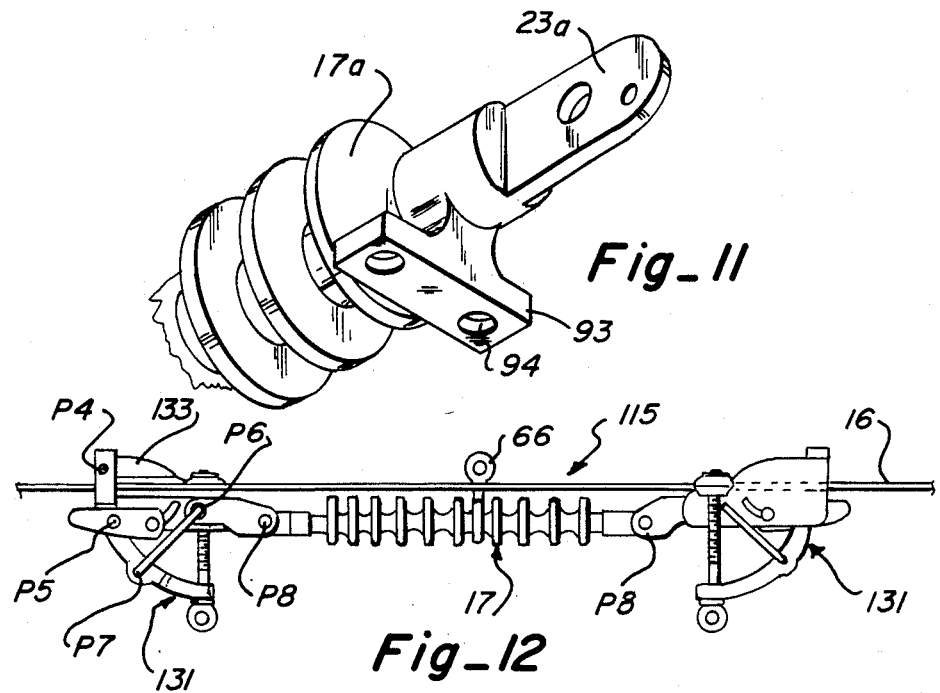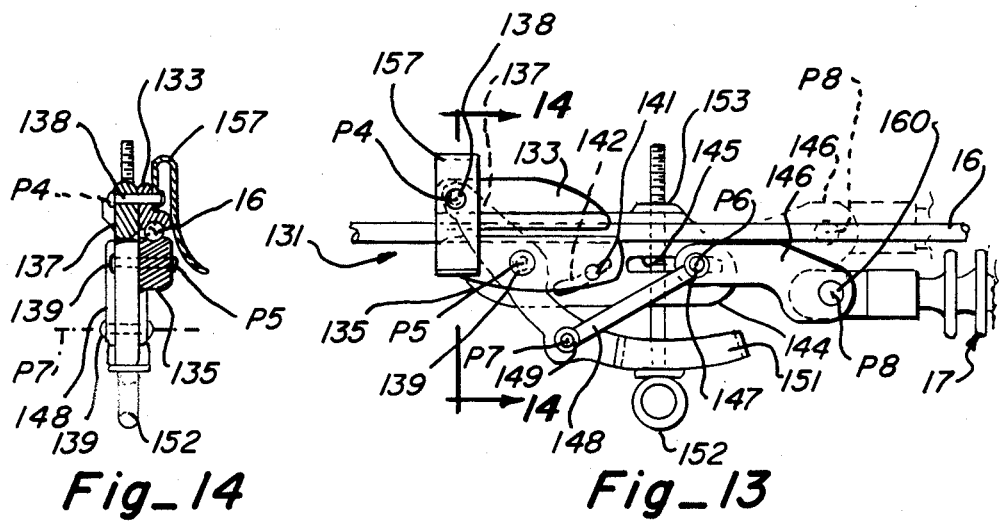

POWER LINE ISOLATING APPARATUS AND METHOD

TECHNICAL FIELD

This invention relates to an apparatus and method for isolating electric power distribution lines.

BACKGROUND ART

Electric power line apparatus and methods have been heretofore provided to disconnect or isolate a segment of a power line such as during power outages or in the reconstruction of existing lines.

Prior practices for isolating selected segments of energized electric power distribution lines have generally required using the line-supporting pole and using more than one person. The isolating apparatus is installed by having persons climbing the pole, clamping the ends of the apparatus to the power line, cutting the line and then securing the line ends. An apparatus and procedure for this type of practice is disclosed in Bridges U.S. Pat. No. 3,838,233. Other line isolating apparatus connected in the power line is disclosed in Hulteen et al. U.S. Pat. No. 3,499,129 and Anderson U.S. Pat. No. 3,813,504 but these devices are not suitable for being installed and activated by one person standing on the ground below the power line. Another problem with prior practices is that are taken users out of service.

SUMMARY OF THE INVENTION

Isolating apparatus for electric power lines disclosed has an insulator, and a pair of line clamps are pivotally mounted at opposite ends of the insulator to form an articulated power line isolating assembly. The clamps are initially disposed at a selected angle to the insulator. Each clamp has two clamp members that are operable to clamp to the line. A hot-line tool is used by linemen to engage an actuator, preferably an nut, for actuating the clamp members from a distance such as by a lineman standing on the ground below the line. A hook-up member on the assembly enables the assembly to be raised, preferably by one lineman using a hot-line tool, to a power line from below. Hook-like support members are provided on the sides of the assembly and preferably one on each clamp which enable the assembly to be raised and hung on the power line and then pulled into place for clamping from below. In one embodiment disclosed the jaws of each clamp have curved clamping surfaces that serve to take up the line during clamping to compensate for the movement of the clamps from an angular to a straight line position relative to the insulator once the line is interrupted between the ends so the length of the power line does not change. The curved clamping surfaces and movement of one of the clamp members also provide a cam action to grip tighter under line tension. A cut-out assembly mounts to the insulator and connects a fuse or a wire across the insulator for a fuse disconnect or disconnect operations. Another embodiment of a line isolating assembly disclosed has clamps with the jaw portions having clamping surfaces that are straight in the direction of the line.

BRIEF DESCRIPTION OF THE DRAWINGS

FIG. 1 is a side elevation view of an isolating assembly shown as hung on a power line before clamping;

FIG. 2 is a side elevation view of the isolating assembly clamped to a power line with a portion of a hot-line tool illustrated for use in actuating the eye nut of the clamp;

FIG. 3 is a side elevation view of the isolating assembly after the power line has been cut;

FIG. 4 is a sectional view taken along lines 4—4 of FIG. 1;

FIG. 5 is an enlarged vertical sectional view taken along lines 5—5 of FIG. 6;

FIG. 6 is a sectional view taken along lines 6—6 of FIG. 3 with the line supported or hung position of FIG. 1 shown in dashed lines;

FIG. 7 is a perspective view of the isolating assembly shown in FIG. 1;

FIG. 8 is a perspective view of a portion of one clamp:

FIG. 9 is a side elevation view of the isolating assembly clamped to the power line to which a cut-out assembly with a fuse has been mounted and with an inoperative position for the fuse shown in dashed lines;

FIG. 10 is a fragmentary side elevation view of a cut-out assembly with a shorting wire in place of the fuse that would provide an electrical connection between the cut lines via the wire;

FIG. 11 is a fragmentary perspective view of an end portion of an alternative form of insulator to which the cut-out assemblies shown in FIGS. 9 and 10 may be readily attached;

FIG. 12 is a side elevation view of another form of isolating assembly using another line clamp with the clamps disposed in an unclamped position and prior to cutting the line;

FIG. 13 is a side elevation view of the clamp shown in FIG. 12 in the clamped position with the position after the line is cut in dashed lines;

FIG. 14 is a sectional view taken along lines 14—14 of FIG. 13.

DETAILED DESCRIPTION

Referring now to the drawings there is shown in FIG. 1 a line isolating assembly 15 of the present invention hanging from a segment of an electric power line 16 which typically is supported between two upright poles and sags so the power line 16 extends along a slightly downward concave curve and the line is under a substantial tension. The assembly 15 shown in FIGS. 1–8 includes a conventional insulator assembly 17 commonly referred to in the trade as an Epoxilator. The insulator assembly 17 shown includes a centrally disposed fiberglass circular rod 21 having a series of axially spaced peripheral circular fins 22 formed integral with the rod and an end fitting 23, made of a conductive material preferably metal. The end fitting has a socket portion 24 which slide fits over and is rigidly affixed to the end portion of rod 21. Each end fitting 23 further has a lug portion 25 opposite portion 24 provided with holes 26 and 27.

A pair of line clamps 31 are pivotally mounted to the opposite ends of insulator assembly 17 and are movable freely relative to assembly 17 to form an articulated power line isolating assembly 15. Each line clamp 31 is of an identical construction and includes a first clamp member 33 pivotally connected at one end to the end of the insulator to pivot about pivot point P1. A second clamp member 35 is pivotally connected to the first clamp member 33 to move toward and away from the first clamp member about a pivot point P2 between a clamping position and a spread, open or non-clamping position enabling the line to be placed between the two clamp members 33 and 35.

The first clamp member 33 is generally stationary and is in the form of an elongated body having a jaw portion 37 formed along a top edge adjacent the outer end with this top edge providing a clamping or gripping surface 38. Clamping surface 38 is generally inwardly concave and is of a generally semi-circular shape in a longitudinal direction along member 33. The gripping surface 38 is also inwardly curved in a transverse direction to generally conform to the circular cross-section of the wire. The length of the curve in gripping surface 38 in the longitudinal direction is selected to compensate for the length of the line that is lost due to the clamps moving from an angular relationship designated by angle A in FIG. 1 to a straight or in-line relationship with the insulator assembly 17 caused by tension in the line after the assembly has been installed as seen in FIG. 3. The increase in length is the distance the clamp moves in an arc about pivot P1 as compared to the perpendicular distance from the power line through the pivot point P1. This increased length is designated d in FIG. 1. This distance d is made equal to the length of the curve 38 in the longitudinal direction minus the straight distance from one end of the curve to the other. This straight distance would be the diameter of the circular shape. The reasons for maintaining the same length in the power line are to meet code which does not allow too much sag in the line and avoid overstressing the line which would result if the line length were changed.

The second clamp member 35 which is generally movable relative to member 33 is in the form of an elongated body which is narrower and circular at a pivoted end and wider and circular at the free camming end. Member 35 has a jaw portion 41 extending along the bottom having a clamping or gripping surface 42 that is generally complementary in shape with that of gripping surface 38, i.e. semi-circular, in the longitudinal direction and further is also inwardly curved in the transverse direction to conform to the circular cross-section of the power line. This latter gripping surface is shown as a series of transverse teeth 43 to aid in gripping the line.

The pivotal connection at pivot P1 is provided by having a clevis portion 46 at the inner end of the first clamp member 33 with aligned holes 47 into which lug portion 25 is slidably received so that holes 47 and hole 26 align and a connecting pivot pin 49 extends therethrough and is held by a retaining washer 51.

A shear pin 52 extends through aligned holes 53 in the clevis and hole 27 in fitting 23 which serves as a releasable holding means to temporarily hold each clamp member at a selected angle designated A to the longitudinal axis of the insulator as above discussed after the assembly 15 is installed; and once the power line is cut, the tension on the line causes the shear pins 52 to break, enabling the clamps to move to the straight line position shown in FIG. 3. This angular relationship also spaces the insulator from the power line during installation.

The pivotal connection at pivot point P2 is provided by an upright lug portion 55 which extends up from one side face of the clamp member 33 at the outer end thereof and has a hole 56 provided in the top end portion. A connecting pivot bolt 57 extends through hole 56 and a hole 58 in a narrower end portion of the second clamp member 35 to position the second clamp member so that it is opposite and in the same plane as the first clamp member as seen in FIG. 6. The location of pivot P2 above and to one side of the gripping surface 42 along with the curved surface in the longitudinal direction provides a cam action which causes the clamp member 35 to further grip or tighten the clamping action under the tension of the power line as best seen in FIGS. 3 and 5.

The actuator for moving member 35 relative to member 33 is provided by a threaded bolt 61 having a bent top end section 62 at one end disposed at right angles to the straight main shank portion of the bolt and opposite the bolt threads extending through a second hole 63 in the clamp member 35. The threaded end of the bolt 61 extends through a lug 64 projecting laterally out from the side of the clamp member 35. An eye nut 65 is threaded on the threads of bolt 61 so that as the nut is tightened, the gripping surfaces of the two clamp members clamp to the line and the unclamping is accomplished by rotating the nut in the opposite direction.

A hook-up member 66 in the form of a lift eye bolt or eye is shown mounted on the insulator assembly 17 midway between the ends (center of balance) for use having the isolating assembly 15 lifted up by a lineman to the power line as with a hot-line tool H. Member 66 may be rigidly affixed to assembly 17 or may rotate thereon to be depending when engaged by the hot-line tool and rotate to the up position shown when lifted.

In FIG. 2 there is shown a hot-line tool hot-line tool is of a conventional construction and is well known in the power line art and consists of an upper end portion 77 at the end of a long rod 78 having a hole 79 through which a rod with a slidable hook 80 extends. The hook can be raised and hooked into the eye nut 65 and can be rotated and then the hook extended and retracted as required. The hot-line tool is electrically insulated to enable the device to be manipulated from below at a distance from the power line without danger to the personnel using the hot-line tool.

To enable the isolating assembly 15 to be hung or supported on the power line, there are provided support members 68 in the form of flexible clips. Each support member or clip 68 is mounted on the side of each clamp member 35 so they are equal distances from the midpoint of the insulator. This clip has an end portion 69 folded back on itself and provided with a hole 71 through which the bent end section 62 extends with a lock washer 72 for fastening the clip to the side of the clamp member 35. The clip further has a free flared end portion 75 opposite portion 69 that extends down along the side of the second clamp member and then along the side of the first clamp member. The clip is resilient so that the assembly may be elevated and hung on the power line as shown in dashed lines in FIG. 6. The assembly is then pulled down by using the hot-line tool causing the power line 16 to move between the flared end portion 75 and into the space or gap between the two opposed clamp members 33 and 35 in the unclamped position. The eye nuts 65 of the clamp are then threaded down to clamp the respective jaws of both clamps against the power line 16.

Referring now to FIG. 9, there is shown a cut-out assembly 81 mounted to the ends of the insulator assembly. This cut-out assembly is particularly adapted to be mounted to the isolating assembly 15 once the lines have been cut for the purpose of providing a fuse disconnect. The cut-out assembly 81 shown in FIG. 9 is of a conventional construction and has a pair of oppositely disposed end members 82 and 83 each with a top flange 84. A U-bolt 85 extends around the socket portion of the isolator and is bolted to the respective flanges 84. This construction enables the cut-out assembly to be readily attached to the line isolating assembly 15 from a distance as from the ground after the assembly is in place if a fuse is required. A fuse 87 is shown pivotally connected to one end of the end members and moves between a connected position shown in full lines and a disconnected position shown in dashed lines at 87a. An alternative cut-out assembly 91 shows a straight conductive wire 92 connected through the center of the fuse and this is used for line disconnect purposes. In both cases the fuse 87 or the wire 92 by-passes the insulator 17 so that electricity will flow through the power line.

An alternative form of insulator assembly 17a shown in FIG. 11 has the end fitting 23a of the insulator formed with a flange 93 with holes 94 to which the cut-out assembly 81 shown in FIG. 9 may be readily bolted as from the ground.

It is understood that other forms of line clamps may be used to connect the insulator assembly 17 to the power line 16. An alternative embodiment of line isolating assembly 115 shown in FIGS. 12–14 includes an insulator assembly 17 having a pair of line clamps 131 pivotally mounted at the opposite ends to pivot at pivot P8. Each line clamp 131 includes a first clamp member 133 which is generally stationary and a second clamp member 135 which is generally movable relative to the first clamp member 133. Clamp member 133 is pivotally connected to the second clamp member to pivot about pivot P4 through a connecting link 137. The connecting link 137 has a hole which receives a pivot pin 138 to provide pivot P4 and a hole which receives a pivot pin 139 extending through a hole in the second clamp member 135 to provide a pivot P5. The second clamp member 135 further has a pin 141 that moves in a curved slot 142 in the first clamp member which serves to guide the second clamp member between a clamping position and an unclamped position.

The first clamp member 133 is in the form of an elongated body having inner end portion 144 provided with an elongated slot 145 extending lengthwise of the body. For actuating or moving the second clamp member between clamping and unclamped positions, there is provided a slid arm 146 which has a slide bolt 147 affixed to an outer end that slides in the slot 145. A pair of diagonal arms 148 pivotally connect at one end to the slide bolt 147 at pivot P6 and at the other end pivotally connect to the link 137 by a pivot pin 149 at pivot P7 so that when the bolt 147 is moved in the slot 145 to the left, as shown, the clamp members separate, and when moved to the right, the clamp members grip the wire 16. The inner end portion of the slide arm 146 pivotally connects to the end of the insulator assembly 17 by a pivot pin 160 at a pivot P8. Slot 142 extends in a direction that is generally parallel to along diagonal arms 148.

The clamp members 133 and 135 having connecting link 137 so connected at pivots P4 and P5 operate much like a pliers tool using the slotted end portion of member 133 and the extension 151 as handles thereof. The movement of the arms 148 about pivot P7 opens and closes the clamp member. After the line has been cut, there is a cam-like action through arms 148 whereby the tension in the line acting through arms 148 causes a tightening of the clamping members. The clamp members 133 and 135 have jaw portions that are straight in the longitudinal direction so there is no accommodation in this embodiment to take up the line due to the clamp member pivoting through an angle. The jaw portions are curved in the transverse direction to conform to the circular shape of the line.

The initial actuating or clamping of this clamp is accomplished by providing an acurate end extension 151 that is an extension of link 137 beyond pivot P7 which extends generally parallel to and spaced from member 133. An eye bolt 152 extends through an elongated slot in the extension 151 and through a hole (not shown) in the side of the first clamp member 133. A nut 153 is threaded on the bolt. When this bolt 152 is tightened, the two clamp members 133 and 135 are moved together to clamp against the wire. This is the initial clamping to clamp the clamps 131 to the wire. When the wire 16 is cut, the movable arm 146 moves about a pivot P6 to a position in which the insulator assembly 17 and pivot P8 are disposed in line with the power line 16 due to the tension in the line as is shown in dashed lines. The support clip 157 is shown attached to the side of each clamp 131 for hanging the assembly on the power line as was described in connection with the embodiment shown in FIGS. 1–8.

OPERATION

In the use of the above described apparatus, the assembly is lifted to the power line by a lineman using a hot-line tool H engaging the eyelet 66; and the clips 68 or 157 hold the assembly to the line 16. A downward force is applied to the assembly to pull the line between each of the two clamp members. The hot-line tool H is used to rotate the eyenut 65 or eye bolt 152 to clamp the respective clamps to the power line. The power line is then cut. The cut-out assemblies 81 may be installed as above described as required.

From the foregoing, it is apparent that the above described apparatus is readily installed on an energized power line by linemen using a hot-line tool. The apparatus is capable of being installed in less than ten minutes without the interruption in the delivery of power. The apparatus of the first form does not affect conductor sag. The apparatus allows for fusing or switching. The apparatus provides for isolation protection to line personnel by incorporating currently approved insulating equipment.

Although the present invention has been described with a certain degree of particularity, it is understood that the present disclosure has been made by way of example and that changes in details of structure may be made without departing from the spirit thereof.

What is claimed is:

1. Isolating apparatus for electric power lines comprising:
   an insulator,
   a pair of line clamps pivotally mounted to opposite ends of said insulator to provide an isolating assembly, each said line clamp including a first clamp member connected to pivot about an end portion of said insulator about a first pivot and a second clamp member movable relative to said first clamp member between clamping and non-clamping positions, each said line clamp having an actuator operable from a distance to clamp each line clamp to the power line whereby upon the cutting of said clamped power line between said line clamps to provide two line ends, said line clamps pivot about the associated first pivots under the tension in said power line to move to a second position and said isolating assembly connects said line ends together via said insulator with said insulator electrically isolating said line ends, hook-up means on said isolating assembly which enables said assembly to be lifted by a lift device to an overhead power line, and support means on said isolating assembly for enabling said assembly to be supported on said power line.

2. Apparatus as set forth in claim 1 wherein said insulator includes an insulating body having a central circular rod and a series of axially spaced peripheral circular fins formed integral with said rod, and an electrically conductive end fitting mounted on each end of said rod, each said fitting having a socket portion for slide fitting over the end of said rod and a lug portion opposite said socket position.

3. Apparatus as set forth in claim 2 wherein said end fitting has a flange with holes adapted to releasably fasten to a cut-out assembly.

4. Apparatus as set forth in claim 1 wherein each said line clamp has releasable holding means for temporarily holding each line clamp at an angle to the longitudinal axis of said insulator.

5. Apparatus as set forth in claim 4 wherein said releasable holding means is provided by a shear pin that extends through aligned holes in portions of said insulator and the respective line clamp.

6. Apparatus as set forth in claim 1 wherein each line clamp has a curved clamping surface in the longitudinal direction of the line clamp for engaging the line which serves to take up a selected length of line during clamping to compensate for said line clamps moving between said first and second positions under the tension of the power line so that the power line is substantially the same length after said assembly is clamped to the power line by said line clamps and cut between said line clamps.

7. Apparatus as set forth in claim 1 wherein said first clamp member is generally stationary in relation to said second clamp member and is in the form of an elongated body having a lug portion at one end and an upwardly facing clamping surface formed in an edge adjacent the opposite end of said lug portion.

8. Apparatus as set forth in claim 1 wherein said second clamp member is generally movable in relation to said first clamp member and is in the form of an elongated body having oppositely disposed circular end portions with one of said circular end portions pivoting about a pivot to move between clamping and unclamped positions and the other of said circular end portions providing a clamping surface.

9. Apparatus as set forth in claim 8 including a lug portion extending up from one side face of said first clamp member and providing a pivoted support for said one end portion of said second clamp member, said pivot being disposed relative to said clamping surfaces to provide a camming action to tighten the clamping members under the tension of said power line.

10. Apparatus as set forth in claim 1 wherein said actuator includes a threaded bolt having an end section extending at right angles to a main shank portion of said bolt and extending through said second clamp member and a threaded end portion opposite said end section extending through a portion of said first clamp member with an eye nut threaded on said bolt whereby the threading of said eye nut on said bolt serves to clamp and unclamp said first and second clamping members of each line clamp.

11. Apparatus as set forth in claim 1 wherein said first clamp member is in the form of an elongated body having an elongated slot in one end portion and a downwardly facing clamping surface formed in an edge adjacent the opposite end of said one end portion.

12. Apparatus as set forth in claim 11 wherein said first clamp member is pivotally connected to said second clamp member by a connecting link, said acutator arranged to move said connecting link to move said second clamp member between clamping and unclamped positions.

13. Apparatus as set forth in claim 12 wherein said clamp actuating means includes an end arm portion forming an extension of said connecting link, an eye bolt extending through, said arm portion and said first clamp member, said eye bolt having a nut thereon, whereby the tightening of the nut causes said first and second clamp members to be drawn together via forces exerted through said connecting link.

14. Apparatus as set forth in claim 12 wherein said clamp actuating means includes a slide arm having a slide bolt at one end slidable at one end in said elongated slot and having the other end pivotally connected to said insulator, at least one diagonal arm pivotally connected at one end to said slide bolt and at the other end to said connecting link whereby the movement of the slide bolt to one end of the slot causes the clamp members to close and to the other end of the slot causes the clamp members to open whereby when the power line is clamped and cut between the line clamps the tension of the power line draws the line clamps toward one another by forces exerted through said diagonal arm.

15. Apparatus as set forth in claim 1 wherein said hook-up means is in the form of an eye bolt mounted at the center of balance of said insulator.

16. Apparatus as set forth in claim 1 wherein said support means is in the form of a hanging clip secured to each second clamp member having a resilient flared end portion that spreads away from the clamp members and clips over the power line and directs the power line between the associated first and second clamp members when a downward force is applied to said assembly.

17. Apparatus as set forth in claim 1 further including a cut-out assembly mounted to said insulator adapted to accommodate a fuse for fuse cut-out purposes after the line isolating assembly is installed on the power line.

18. Apparatus as set forth in claim 1 including a cut-out assembly mounted on said insulator to support a wire across said insulator for disconnect purposes after the line isolating assembly has been installed on the power line.

19. Isolating apparatus for electric power lines under tension comprising:

an insulator assembly including an elongated insulator body and conducting end fittings mounted to each end of said body, a pair of line clamps pivotally mounted to opposite ends of said insulator assembly to provide an articulated power line isolating assembly, each said line clamp including a first clamp member connected to pivot about an end portion of said insulator about a first pivot and a second clamp member movable relative to said first clamp member between clamping and non-clamping positions, each said clamp having releasable holding means to hold each clamp at a selected angle to a longitudinal axis of said insulating assembly, each said line clamp having an actuator operable from a distance to clamp each line clamp to the power line whereby upon, the cutting of said clamped power line between said line clamps to provide two line ends, said line clamps pivot about the associated first pivots under the tension in said power line to move to a second position and said isolating assembly connects said line ends together via said insulator with said insulator electrically isolating said line ends, a hook-up eye bolt mounted to said insulator assembly at the center of balance of said line isolating assembly which enables said line isolating assembly to be lifted by a lifting device to an overhead power line, and a support clip on each second clamp member of said isolating assembly for enabling said isolating assembly to be supported on said power line.

20. The method of electrically isolating a power line comprising the steps of:

lifting a line isolating assembly to a power line, said assembly including an insulator, a line clamp pivotally connected at opposite ends of said insulator, and support means connected with either of said insulator and line clamps to be movable as an integral unit, each said line clamp including a first clamp member and a second clamp member movable relative to said first clamp member between clamping and non-clamping positions, hanging said assembly from said power line by placing said support means on said power line, locating said power line between said first and second clamping members of each line clamp in a non-clamping position by applying a force to said assembly to pull the power line between said first and second clamp members of each line clamp, clamping said line clamps to said power line, said lifting, hanging, locating and clamping being carried out from a distance from said assembly by the use of an elongated tool, and cutting said line between said clamps to provide two line ends whereby said line isolating assembly connects said line ends and said insulator electrically isolates said cut line ends.

21. The method as set forth in claim 20 wherein said power line is maintained at substantially the same length when said line clamps are clamped to said power line.

22. The method as set forth in claim 20 wherein said locating is provided by having said support means in the form of a hanging clip secured to each second clamp member having a resilient flared end portion that spreads away from the associated clamp members over the power line for directing said power line between the associated first and second clamping members when a downward force is applied to said assembly.

23. The method as set forth in claim 20 further including the step of adding a cut-out assembly to said line isolating assembly from a distance from said assembly by the use of an elongated tool for fuse and disconnect purposes.

24. The method as set forth in claim 20 wherein said tool is a hot-line tool used by a lineman on the ground below said power line.

25. The method of electrically isolating a power line comprising the steps of:

lifting a line isolating assembly to a power line, said assembly including an insulator, a line clamp pivotally connected at opposite ends of said insulator, and hook-up means and support means connected with either of said insulator and line clamps to be movable as an integral unit, each said line clamp including a first clamp member and a second clamp member movable relative to said first clamp member between clamping and non-clamping positions, each said line clamp having an actuator operable to clamp each line clamp, hanging said assembly from said power line by placing said support means on said power line, locating said power line between said first and second clamping members of each line clamp in a non-clamping position by applying a downward force to said assembly to pull the power line between said first and second clamp members of each line clamp, clamping said line clamps to said power line by actuating each actuator, said lifting, hanging, locating and clamping being carried out from a distance from said assembly by the use of an elongated tool, and cutting said line between said clamps to provide two line ends whereby said line isolating assembly connects said line ends and said insulator electrically isolates said cut line ends.

* * * * *